(12) United States Patent
Kweon et al.

(10) Patent No.: US 11,083,052 B2
(45) Date of Patent: Aug. 3, 2021

(54) COOKING APPARATUS AND METHOD FOR CONTROLLING SAME

(71) Applicant: Samsung Electronics Co., Ltd., Suwon-si (KR)

(72) Inventors: Soon-cheol Kweon, Seoul (KR); Joon-hyung Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 15/763,262

(22) PCT Filed: Oct. 13, 2016

(86) PCT No.: PCT/KR2016/011508
§ 371 (c)(1),
(2) Date: Mar. 26, 2018

(87) PCT Pub. No.: WO2017/065533
PCT Pub. Date: Apr. 20, 2017

(65) Prior Publication Data
US 2018/0270918 A1    Sep. 20, 2018

(30) Foreign Application Priority Data

Oct. 13, 2015 (KR) .................. 10-2015-0142710

(51) Int. Cl.
*H05B 6/68* (2006.01)
*H05B 6/70* (2006.01)
(Continued)

(52) U.S. Cl.
CPC .............. *H05B 6/687* (2013.01); *F24C 7/02* (2013.01); *F24C 7/08* (2013.01); *G01J 5/10* (2013.01);
(Continued)

(58) Field of Classification Search
CPC .......... H05B 6/645; H05B 6/687; H05B 6/72; H05B 6/705; G01J 5/10; F24C 7/02; F24C 7/08; Y02B 40/146
(Continued)

(56) References Cited

U.S. PATENT DOCUMENTS 5,512,736 A    4/1996 Kang et al.
5,986,249 A    11/1999 Yoshino et al.
(Continued)

FOREIGN PATENT DOCUMENTS

CN    1475702    2/2004
CN    1496195    5/2004
(Continued)

OTHER PUBLICATIONS

Translation of KR20150093466A,, Lee, Dong Hyun, Aug. 18, 2015, ProQuest (Year: 2015).*
(Continued)

*Primary Examiner* — Quang T Van
(74) *Attorney, Agent, or Firm* — Staas & Halsey LLP

(57) ABSTRACT

A cooking apparatus including a transmission antenna for irradiating a substance to be cooked with beamformed electromagnetic waves; a reception antenna for receiving reflected waves reflected from the substance to be cooked; and a controller for determining the temperature of the substance to be cooked corresponding to the received reflected waves on the basis of the property in which the electromagnetic waves, with which the substance to be cooked is irradiated, are reflected differently in accordance with the temperature of the substance to be cooked.

15 Claims, 13 Drawing Sheets

(51) Int. Cl.
| | |
|---|---|
| H05B 6/64 | (2006.01) |
| G01J 5/10 | (2006.01) |
| F24C 7/02 | (2006.01) |
| F24C 7/08 | (2006.01) |
| H05B 6/72 | (2006.01) |

(52) U.S. Cl.
CPC ............. H05B 6/645 (2013.01); H05B 6/705 (2013.01); H05B 6/72 (2013.01); *Y02B 40/00* (2013.01)

(58) Field of Classification Search
USPC ....... 219/710, 746, 745, 748, 750, 749, 678, 219/679, 686, 690, 695, 696; 324/645, 324/637, 638, 642; 455/123, 125, 121, 455/193.1, 193.2; 333/17.3; 422/21, 89
See application file for complete search history.

(56) References Cited

U.S. PATENT DOCUMENTS

| | | |
|---|---|---|
| 6,172,348 B1 | 1/2001 | Yoshino et al. |
| 6,236,025 B1 | 5/2001 | Berkcan et al. |
| 6,396,035 B2 | 5/2002 | Shon et al. |
| 6,802,708 B2 | 10/2004 | Kanzaki et al. |
| 6,914,226 B2 | 7/2005 | Ottaway |
| 8,324,540 B2 | 12/2012 | Nordh et al. |
| 2003/0026321 A1 | 2/2003 | Land |
| 2004/0053187 A1 | 3/2004 | Kanzaki et al. |
| 2010/0155392 A1 | 6/2010 | Nordh et al. |
| 2010/0176123 A1 | 7/2010 | Mihara et al. |
| 2012/0261406 A1 | 10/2012 | Van Rens |
| 2013/0118473 A1 | 5/2013 | Linton |
| 2014/0360380 A1 | 12/2014 | Kishira et al. |
| 2015/0070029 A1* | 3/2015 | Libman .................. H05B 6/686 324/637 |

FOREIGN PATENT DOCUMENTS

| | | |
|---|---|---|
| CN | 101749757 | 6/2010 |
| EP | 2200402 | 6/2010 |
| JP | 2002-156116 | 5/2002 |
| KR | 10-2000-0053492 | 8/2000 |
| KR | 10-2004-0043438 | 5/2004 |
| KR | 10-1455701 | 11/2014 |
| KR | 10-2015-0093466 | 8/2015 |
| WO | 2012/109634 | 8/2012 |
| WO | 2014/198637 | 12/2014 |

OTHER PUBLICATIONS

European Communication under Rule 71(3) dated Sep. 11, 2019 in European Patent Application No. 16855750.2.
International Search Report dated Jan. 25, 2017 in International Patent Application No. PCT/KR2016/011508.
Written Opinion of the International Searching Authority dated Jan. 25, 2017 in International Patent Application No. PCT/KR2016/011508.
Chinese Office Action dated Apr. 2, 2019 in Chinese Patent Application No. 2016800602164.
Chia-Chan Chang et al., "Microwave Beam Focusing/Shaping Phased Antenna Arrays", IEEE MTI-S Digest, 2004, 4 pages.
Extended European Search Report dated Sep. 17, 2018 in European Patent Application No. 16855750.2.

* cited by examiner (a)            (b)

COOKING APPARATUS AND METHOD FOR CONTROLLING SAME

CROSS-REFERENCE TO RELATED APPLICATIONS

This application is a U.S. National Stage Application which claims the benefit under 35 U.S.C. § 371 of International Patent Application No. PCT/KR2016/011508, filed on Oct. 13, 2016, which claims the priority benefit of Korean Patent Application No. 10-2015-0142710, filed on Oct. 13, 2015 in the Korean Patent and Trademark Office, the disclosures of which are hereby incorporated by reference in their entirety.

TECHNICAL FIELD

The present invention relates to a cooking apparatus and a controlling method thereof, and more particularly, to a cooking apparatus which measures food by non-contact and non-invasive methods and provide a user with measured temperature information, and a controlling method thereof.

BACKGROUND TECHNOLOGY

A cooking apparatus is an electronic device for cooking food. The cooking apparatus includes a gas range that utilizes heat generated by burning fuel directly, an electric cooktop that uses heat generated by an electric resistance or an induction current, a microwave oven that uses frictional heat generated by collision and rotation of molecules by irradiating a microwave to a food, and an oven using hot air generated by heating the air in the closed space and the like.

Advances in the field of consumer electronics for cooking have resulted not only in providing a source of heat for safe cooking but also providing a function to automatically cook food with a predetermined course according to the settings entered by a user.

However, conventionally, in the cooking apparatus, the cooking degree of food is tend to be determined by the capacity of the cooking cook. In other words, a cook determined whether or not food is sufficiently cook based sole on experiences of the cook. If a cook wishes to know the temperature of a food, the cook puts a thermometer on the food being heated and measures the temperature. In this case, there was a problem that the external appearance of the food was ruined and it could not be used in an oven or the like which had to be airtight.

In addition, since the automatic cooking function performs uniform cooking without considering the composition and size of the food, it is difficult to obtain the cooked food desired by the user. Further, the automatic cooking function, which is becoming increasingly complicated and increasing in number, such as fermentation, rapid thawing, heating, and drying, has resulted in difficult accessibility rather than convenience of use.

DETAILED DESCRIPTION OF INVENTION

Technical Tasks

The present invention is purposed to solve the aforementioned problems and the purpose of the present invention is to provide a cooking apparatus which measures temperature of food by non-contact and non-invasive methods and provide a user with the measured temperature information and a controlling method thereof.

Means for Solving Problems

In order to achieve the aforementioned purpose of the invention, a cooking apparatus for heating a substance to be cooked is disclosed. The apparatus includes a transmission antenna for irradiating the substance to be cooked with beamformed electromagnetic waves; a reception antenna for receiving reflected waves reflected from the substance to be cooked; and a controller for determining the temperature of the substance to be cooked corresponding to the received reflected waves on the basis of the property in which the electromagnetic waves, with which the substance to be cooked is irradiated, are reflected differently.

The controller, based on impedance of the substance to be cooked which changes according to temperature of the substance to be cooked and a property that the irradiated electromagnetic waves are reflected differently, determines temperature of the substance to be cooked corresponding to the received electromagnetic waves.

The controller, using amplitude ratio of the irradiated electromagnetic waves to the received reflected waves, calculates dielectric permittivity to determine impedance of the substance to be cooked and determines temperature of the substance to be cooked corresponding to the calculated dielectric permittivity.

The transmission antenna irradiates electromagnetic waves of which bandwidth is greater than or equal to 500 MHz, wherein the controller, based on a property that bandwidths to absorb electromagnetic waves are different according to elements constituting the substance to be cooked, determines elements of the substance to be cooked through frequency analysis of the received reflected wave, and based on a property that the electromagnetic waves are reflected differently according to temperature of the substance to be cooked and elements of the substance to be cooked, determines temperature of the substance to be cooked corresponding to elements of the determined substance to be cooked.

The transmission antenna is an array antenna in which a plurality of antenna elements are aligned, and the controller changes phase of the electromagnetic waves each of the plurality of antenna elements radiate and irradiate beamformed electromagnetic waves.

The controller manipulates directivity of the beamformed electromagnetic waves, and when reflective wave which is reflected from the different space is received by the manipulation, senses at least one of a position, size, and shape of the substance to be cooked based on the received reflected wave.

The apparatus may further include a display which displays a screen including cooking state information, wherein the controller determines partial temperature of the substance to be cooked based on the received reflected wave and visually displays the determined partial temperature.

The transmission antennas are plural, the plurality of transmission antennas are arranged side by side at different positions along an internal wall of a cooking room, and the controller controls the plurality of transmission antennas to sequentially irradiate beamformed electromagnetic waves at the different positions, detects a shape of the cooking chamber based on each of the reflected wave sequentially received by the electromagnetic waves, and detects at least one of a position, size, and shape of the substance to be cooked by combining a shape of the plurality of detected shapes of the cooking chamber.

The cooking apparatus may further include a communicator configured to communicate with a user terminal at a remote place, wherein the controller transmits cooking state information of the substance to be cooked to the user terminal.

The cooking apparatus may further include a heating portion which includes at least one of magnetron which irradiates preset microwave or heating line which irradiates heat by electric resistance on the cooking chamber, wherein the controller, if temperature of the determined substance to be cooked reaches the preset temperature, stops the heating portion.

According to an exemplary embodiment, a controlling method of a cooking apparatus which heats a substance to be cooked includes irradiating the substance to be cooked with a beamformed electromagnetic wave; receiving a reflected wave reflected from the substance to be cooked; and determining temperature of the substance to be cooked corresponding to the received reflected wave based on a characteristic that the irradiated electromagnetic wave corresponds to the received reflected wave.

The determining may include, based on impedance of the substance to be cooked which changes according to temperature of the substance to be cooked and a property that the irradiated electromagnetic waves are reflected differently, determining temperature of the substance to be cooked corresponding to the received electromagnetic waves.

The determining may include, using amplitude ratio of the irradiated electromagnetic waves to the received reflected waves, calculating dielectric permittivity to determine impedance of the substance to be cooked and determining temperature of the substance to be cooked corresponding to the calculated dielectric permittivity.

The irradiating may include irradiating electromagnetic waves of which bandwidth is greater than or equal to 500 MHz, wherein the determining comprises, based on a property that bandwidths to absorb electromagnetic waves are different according to elements constituting the substance to be cooked, determining elements of the substance to be cooked through frequency analysis of the received reflected wave, and based on a property that the electromagnetic waves are reflected differently according to temperature of the substance to be cooked and elements of the substance to be cooked, determining temperature of the substance to be cooked corresponding to elements of the determined substance to be cooked.

The irradiating may include changing a phase of the electromagnetic waves each of the plurality of antenna radiate and irradiating beamformed electromagnetic waves The controlling method may further include manipulating direction of the beamformed electromagnetic wave and, when the reflected wave is received by the manipulation, detecting at least one of a position, shape, and size of the substance to be cooked based on the received reflected wave.

In this case, the determining may determine a local temperature of the food based on the received reflected wave, and visually display the shape of the sensed food and the determined local temperature.

The control method may further include controlling a plurality of transmission antennas arranged at different positions along the inner wall of the cooking chamber so that the beamformed electromagnetic waves sequentially irradiated at the different positions are emitted. The shape of the cooking chamber is sensed based on each of the reflected waves sequentially received by the irradiated electromagnetic wave and at least one of the position, size, and shape of the food can be detected by combining shapes of the plurality of sensed cooking chambers.

The control method may further include transmitting the cooking state information of the food to the user terminal at a remote place.

The control method may further include stopping the emission of microwaves or heat for cooking the cooked food when the temperature of the cooked food reaches a preset temperature.

Effect of Invention

The cooking apparatus and the control method thereof according to the above various embodiments can achieve the following effects.

The cooking apparatus of the present disclosure can preserve the appearance of the food by measuring the temperature of food by non-contact and non-invasive methods.

Further, the cooking apparatus can measure the temperature of the deep portion as well as the outer surface of the food.

Further, the cooking apparatus can grasp the composition, shape and size of the food, and provide the cooking function to the user according to the state of the cooked food and the characteristics of the food.

BEST MODE OF INVENTION

Mode for Working the Invention

Hereinafter, embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
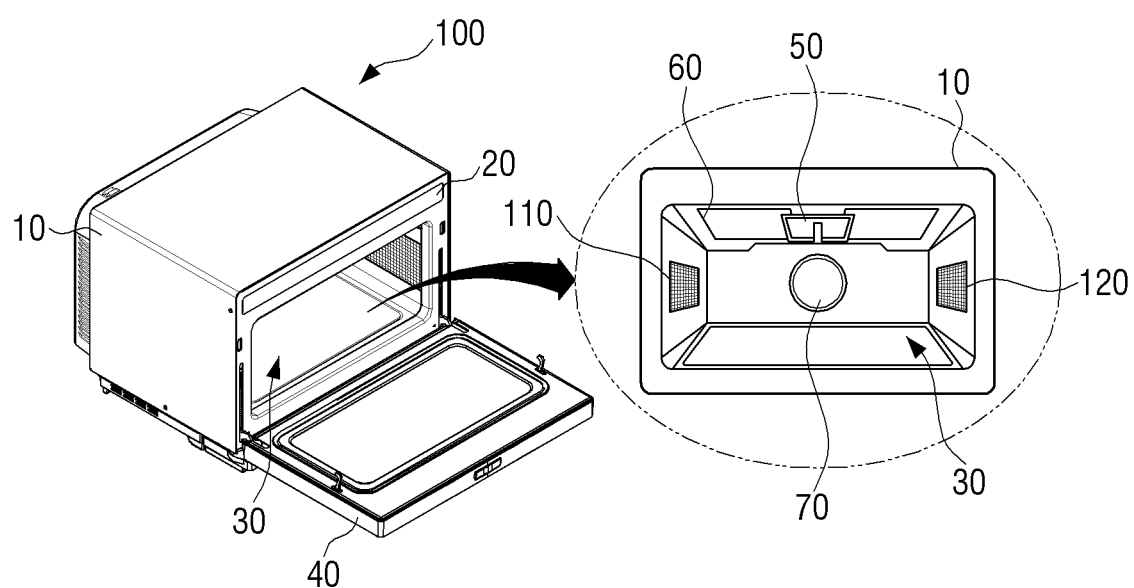
FIG. 1 is a drawing which illustrates an appearance of a cooking apparatus according to an exemplary embodiment.

FIG. 1 is a drawing which illustrates an appearance of a cooking apparatus according to an exemplary embodiment.

Referring to FIG. 1, the cooking apparatus 100 includes an outer wall 10, a control panel 20, a cooking chamber 30, and a door 40. The cooking chamber 30 of the cooking apparatus 100 includes a microwave generation unit 50, a heating unit 60, a hot air oven hole 70 and transmission and reception antennas 110 and 120 disposed on the inner wall.

The outer wall 10 forms an outer appearance of the cooking apparatus 100, and has a machine chamber (not shown) and the cooking chamber 30 inside. The outer wall 10 is made of a durable material and has a door 40 which is hinge-coupled on an opened one side.

The control panel 20 is disposed on the front surface of the cooking apparatus 100. The control panel 20 includes an input unit for inputting a command for driving and setting the cooking apparatus 100 and a display for providing information to the user. Specifically, the control panel 20 receives a user's operation through a sensor that senses a user's touch or an input unit including a physical button, and uses at least one active/passive matrix display and a light emitting diode to provide information such as power, under cooking, automatic cooking menu, setting time, and the like to the user.

A door 40 is hinge-coupled to a main body to be opened and closed. In order to maintained a closed state, a latch can be included. The door 40 may include a handle which a user may grasp.

The cooking chamber 30 is a place where food is positioned inside the cooking apparatus 100. The cooking chamber 30 may include configurations for cooking food as shown below.

A microwave generator 50 may include a magnetron which generates microwave, a wave guide which processes microwave toward food, and an agitator which stirs microwave.

A heating portion 60 includes a heating line which faces a side where food is positioned.

Though not illustrated, the cooking apparatus 200 may further include a steam sprayer which sprays water supplied from a water supply device.

A hot water oven hall 70 generates circulating wind. As seen in the above configuration, the cooking apparatus 100 as illustrated in FIG. 1 is a device where a microwave and a steam oven are combined.

On the other hand, the cooking chamber 30 includes one or a plurality of transmitting and reception antennas 110 and 120. The transmission and reception antennas 110 and 120 transmit and receive electromagnetic waves. The transmission and reception antennas 110 and 120 may emit electromagnetic waves in the direction in which the food is placed and/or receive reflected electromagnetic waves. Functions using the transmission and reception antennas 110 and 120 will be described in more detail with reference to the following drawings.

Figure 2:
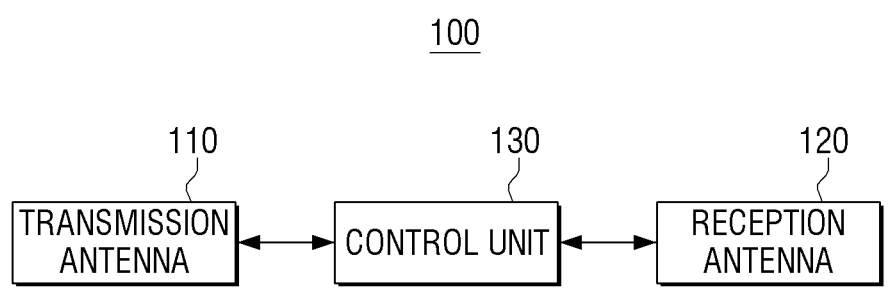
FIG. 2 is a block diagram which illustrates a configuration of a cooking apparatus according to an exemplary embodiment.

FIG. 2 is a block diagram which illustrates a configuration of a cooking apparatus according to an exemplary embodiment.

Referring to FIG. 2, the cooking apparatus 100 includes the transmission antenna 110, reception antenna 120, and the controller 130.

The transmission antenna 110 irradiates electromagnetic wave. To be specific, the transmission antenna 110 irradiates electromagnetic wave. Here, the irradiated electromagnetic wave may be electromagnetic wave which is beamformed to food.

Beamforming (BF) is technology to transmit a radio signal which concentrates a size and a direction of a signal to a specific space. This is the technology to improve a signal transmission distance and efficiency then antenna which emits signal in an omni direction manner.

The transmission antenna 110 may be an array antenna in which a plurality of antenna elements are aligned. Specifically, the transmission antenna 110 may be composed of a plurality of antenna elements capable of varying the phase. A detailed description will be given later with reference to FIG. 4.

The transmission antenna 110 may emit electromagnetic waves having a bandwidth of 500 MHz or more. Specifically, the transmission antenna 110 may be implemented as an ultra wide band (UWB) antenna. Ultra-wideband antennas are able to grasp the reflection characteristics of different foods according to frequency by irradiating the food with electromagnetic waves over a wide frequency band.

In another embodiment, the transmission antenna 110 may be implemented as a multi-frequency antenna that emits electromagnetic waves in a plurality of frequency bands. In another embodiment, the transmission antenna 110 may vary the frequency of the electromagnetic wave to be emitted and may vary the frequency from the start frequency to the end frequency at a preset sweep rate under the control of the controller 130, and perform a frequency sweep that irradiates electromagnetic waves.

The reception antenna 120 receives electromagnetic wave. To be specific, the reception antenna 110 receives a reflected wave which means electromagnetic which is radiated toward food is hit by food and reflected.

In FIG. 2, the reception antenna 120 and the transmission antenna 110 are shown as discrete separate blocks. However, the reception antenna 120 and the transmission antenna 110 are not limited to two separated antennas. The transmission antenna 120 and the reception antenna 130 may be implemented as one antenna capable of performing both reception and transmission.

The controller 130 controls each configuration of the cooking apparatus 100. To be specific, the controller 130 may control the transmission antenna 110 and the reception antenna 120 to estimate temperature of food.

The controller 130 may determine the temperature of the food corresponding to the received reflected wave. Specifically, the controller 130 can determine the temperature of the food from the characteristics of the received reflected waves based on the characteristics of the electromagnetic waves irradiated with food being reflected differently according to the temperature of the food.

A material has electromagnetic properties that vary with temperature. Specifically, food has a different permittivity depending on the temperature. This dielectric constant affects the transmission and reflection characteristics of electromagnetic waves. In addition, a substance has unique electromagnetic properties depending on the constituent constituting the substance. Consequently, when the cooking apparatus 100 determines the permittivity of the food, it can indirectly estimate the composition and the temperature of the food.

The controller 130 determines the temperature of the food corresponding to the received reflected wave based on the characteristics of the reflected electromagnetic waves differently depending on the impedance of the food and the impedance of the food that changes according to the temperature of the food. That is, even if the same electromagnetic wave is irradiated, the controller 130 can estimate the temperature of the food from the characteristic that different reflected waves are received due to the impedance of the food depending on the temperature of the food. In other words, the impedance is the ratio of the electric field to the magnetic field, which is inversely proportional to the square root of the permittivity of the material.

In an exemplary embodiment, the controller 130, in order to calculate impedance, may use calculation of 2-port S-parameter with the transmission antenna 110 as an input port and the reception antenna 120 as an output port.

Here, the controller 130 may calculate the permittivity of the food using the amplitude ratio of the electromagnetic wave and the received reflected wave, and determine the temperature of the food corresponding to the calculated permittivity. A more detailed description thereof will be described later with reference to FIG. 5.

The controller 130 may control the phases of the electromagnetic waves of the plurality of antenna elements for beamforming of the transmission antenna 110 implemented by the array antenna. The controller 130 may control at least one of the phase and the magnitude of the electromagnetic waves emitted from the plurality of antenna elements to form a spatially multiplexed beam. This beamforming allows localized electromagnetic waves to be irradiated to the surface of the food as well as to a specific location in the deep.

The controller 130 includes at least one processor for performing calculation of impedance and beamforming. This will be described with reference to FIG. 3.

The controller 130 includes a storage unit for storing various information to be used for temperature estimation. The storage place stores experimentally acquired data to be used when the controller 130 estimates the temperature. Specifically, the controller 130 stores the reflection property of the electromagnetic wave reflected by each food and/or ingredient (e.g., moisture, fat, protein, and carbohydrate) in order to grasp the composition of the food in the initial state immediately before cooking. The reflection characteristic may be referred to as reflection loss, propagation loss, electromagnetic wave absorption pattern, or the like. The controller 130 may refer to a storage place storing a lookup table (LUT) that summarizes the sizes of the food types and the reflected waves for each temperature to grasp the temperature of the food corresponding to the received reflected waves.

The aforementioned cooking apparatus may measure temperature of the food by non-contact and non-invasive methods.

Figure 3:
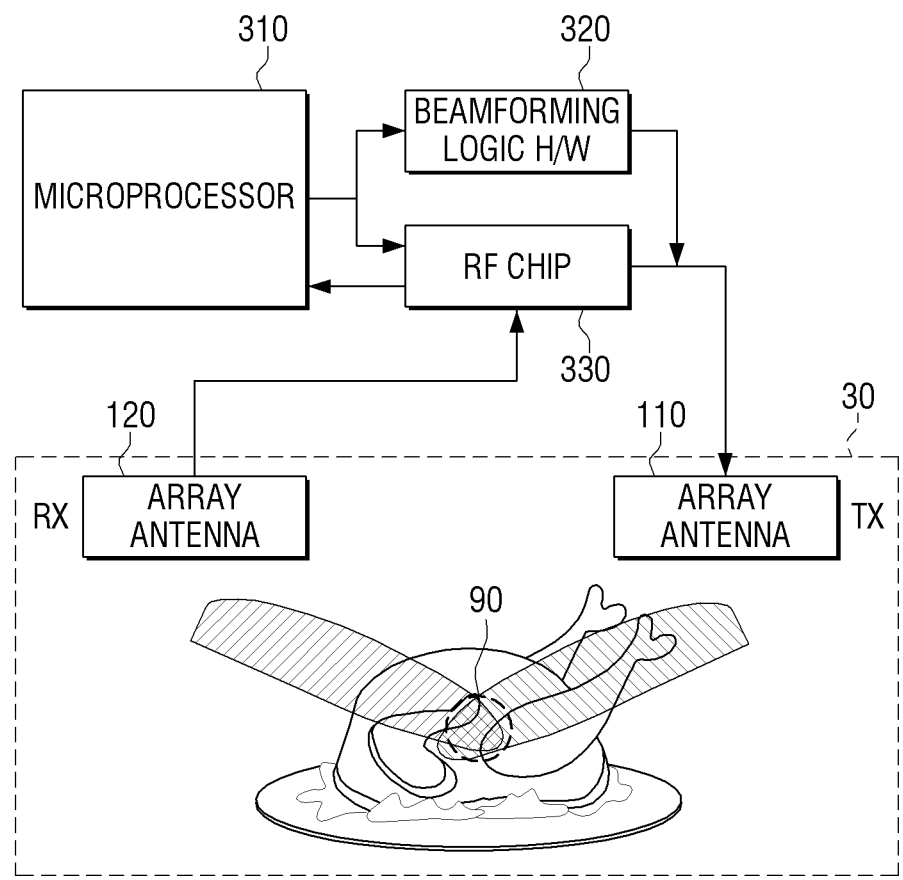
FIG. 3 is a block diagram to describe a detailed configuration of a cooking apparatus of FIG. 2.

FIG. 3 is a block diagram to describe a detailed configuration of a cooking apparatus of FIG. 2.

Referring to FIG. 3, the controller 130 of FIG. 2 includes a microprocessor 310, a beamforming logic hardware 320, and an RF chip 330.

The microprocessor 310 controls the beamforming logic hardware 320. Specifically, the microprocessor 310 may transmit information to the beamforming logic hardware 320 about the location at which it wishes to irradiate electromagnetic waves in the cooking chamber 30.

In addition, the microprocessor 310 controls the RF chip 330. Specifically, the microprocessor 310 may transmit a signal instructing initiation of driving to the RF chip 330 including a driver for driving electromagnetic wave emission of the array antenna 110. Here, the microprocessor 310 can transmit to the RF chip a signal related to the electromagnetic wave characteristics set such as the bandwidth of the electromagnetic wave, the range of the frequency sweep, the amplitude of the electromagnetic wave, and the like.

The beamforming logic hardware 320 uses the address information of the arrayed antenna elements of the array antenna 110 to estimate the amplification magnitude and/or phase (or delay) value of each antenna element for beamforming from the array antenna 110.

The RF chip 330 transmits an electric signal to irradiate EM wave according to received setting information to the array antenna 110.

The transmission side (Tx) array antenna 110 of the cooking chamber 30 irradiates beamformed electromagnetic wave to a part of the food 90.

Receiver side (Rx) array antenna 120 receives reflected waves of beamformed electromagnetic waves reflected from food 90. The array antenna 120 transmits an electrical signal of the received reflected wave to the RF chip 330.

The RF chip 330 transmits to the microprocessor 310 information relating to the characteristic of reflected wave which went through filtering and digital converting.

The microprocessor 310 compares the information that sets the characteristics of the irradiated electromagnetic wave and the analyzed characteristics of the received reflected wave to calculate an impedance for the location 90 locally irradiated on the food. Then, the microprocessor 310 estimates the temperature corresponding to the impedance calculated based on the impedance information of the chicken according to temperature stored in the storage (not shown) as the temperature of the local portion 90 irradiated with the beamformed electromagnetic wave.

The cooking apparatus may measure temperature of the substance to be cooked by non-contact and non-invasive manner.

Figure 4:
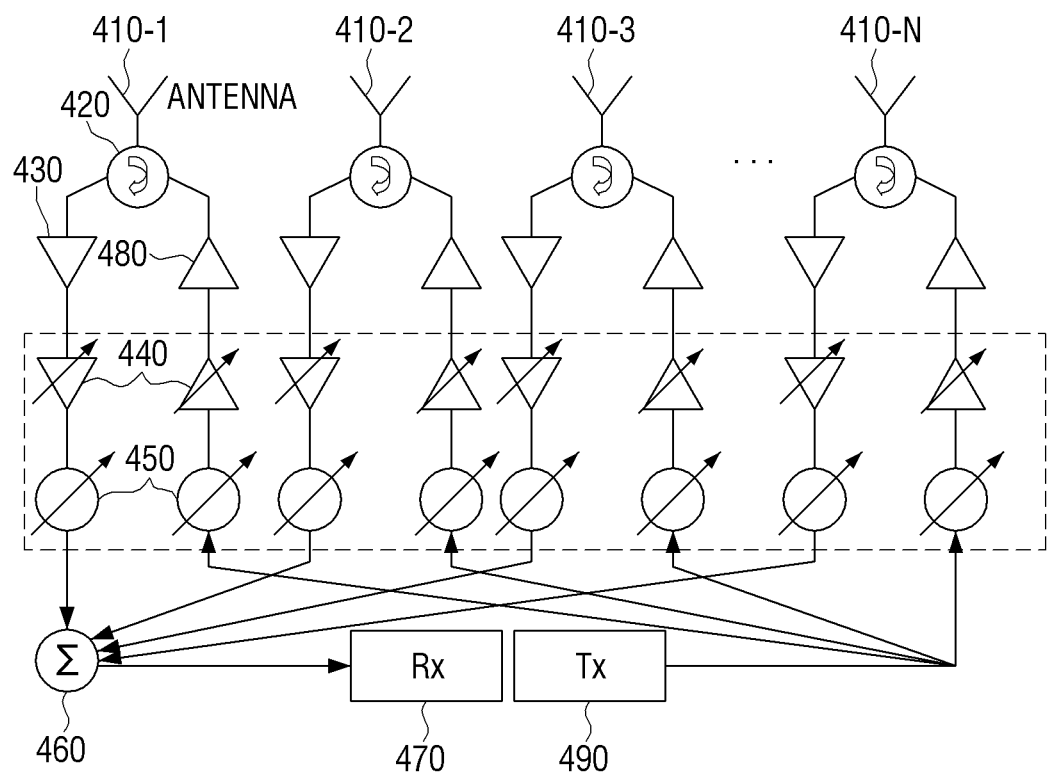
FIG. 4 is a diagram which illustrates logical structure of PAA to describe PAA.

FIG. 4 is a diagram which illustrates logical structure of PAA to describe PAA.

Referring to FIG. 4, a phased array antenna (PAA) includes a plurality of antenna elements 410-1, 410-2, 410-3, ..., 410-N. The PAA of FIG. 4 is a linear array antenna, and a plurality of antenna elements 410-1, 410-2, 410-3, ..., 410-N are arranged in a line. In another embodiment, the PAA may be a planar array antenna in which a plurality of antenna elements are arranged vertically and horizontally. The logical blocks connected to each of the plurality of antenna elements 410-1, 410-2, 410-3, ..., 410-N are the same. In the following description, the logical structure is described on behalf of the first antenna element 410-1.

The PAA in FIG. 4 includes a Tx mode for irradiating electromagnetic waves and an Rx mode for receiving reflected waves. The PAA includes a Tx block 490 for controlling the Tx mode and an Rx block 470 for controlling the Rx mode. The logic in which the Tx mode and the Rx mode are switched is represented by the switching block 420.

In the Rx mode, a signal which is received through the antenna element 410-1 is input to the beamformer through the low noise amplifier (LNA: 430). The LNA 430 amplifies received weak electromagnetic signal and lowers noise.

The beamformer includes a variable amplifier 440 and a phase shifter 450. The variable amplifier 440 amplifies the magnitude of the received signal and can vary the amplitude amplified by the control. The phase shifter 450 can adjust the degree to which the phase of the received signal is shifted.

Signals received from each antenna element 410-1, 410-2, 410-3, . . . , 410-N are collected from an integrator 460 and inputted to an Rx block 470.

In Tx mode, the Tx block 490 generates an electronic signal to generate electromagnetic waves to be transmitted through each antenna element 410-1, 410-2, 410-3, . . . , 410-N and transmit the signal to the beamformer.

The beamformer, so that beam is formed to a desired position, amplifies the signal to a variable amplifier 440 and changes phase to a phase converter 450 to antenna elements 410-1, 410-2, 410-3, . . . , 410-N.

FIG. 4 illustrates PAA using an analog beamformer, but the present invention is not limited thereto. In actual implementation, the PAA can form a digital beamformer (DBF). The digital beamformer may include an RF transistor, an analog-to-digital converter (ADC), a digital-to-analog converter (DAC), a digital I/Q demodulator, and a digital signal processor.

The PAA can be used as the transmission antenna 110 and the reception antenna 120 of FIGS. 2 and 3. The PAA enables reception and transmission of electromagnetic waves having spatial orientation by control of the controller 130.

Figure 5:
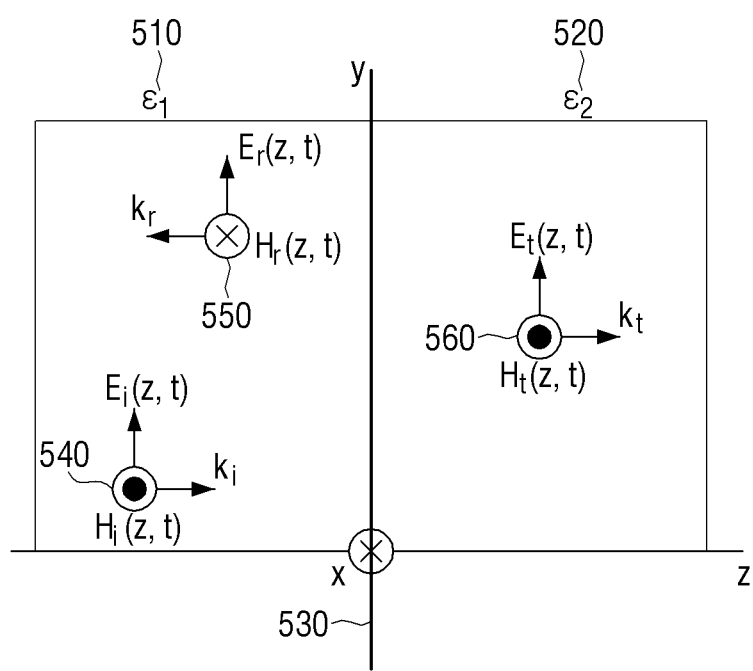
FIG. 5 is a diagram to describe electromagnetic characteristic of plane wave and reflected wave.

FIG. 5 is a diagram to describe electromagnetic characteristic of plane wave and reflected wave.

Referring to FIG. 5, an incident wave 540 is incident on the second medium 520 toward the boundary surface 530. The first medium 510 has a permittivity of $\varepsilon_1$. The second medium 520 has a permittivity of $\varepsilon_2$. The incident wave 540 propagates in the direction of ki in the first medium 510. The incident wave 540 is composed of an electric field component $E_i$ and a magnetic field component $H_1$ which have a direction z and a time t as variables.

Only a part of the incident wave 540 running into the second medium 520 is transmitted and the remaining part is reflected. The transmission wave 530 propagating into the second medium 520 is represented by a wave vector $k_t$ composed of an electric field $E_t$ and a magnetic field $H_t$. The reflected wave 550 is 180 degrees out of phase with the incident wave 540 and is represented by a wave vector $k_r$ composed of the electric field $E_r$ and the magnetic field $H_r$.

For convenient explanation, it is assumed that the direction of the wave vector $k_i$ of the incident wave 540 is perpendicular to the boundary surface 530 where the first medium 510 and the second medium 520 are in contact with each other. Therefore, $k_t$ is parallel to $k_i$ and $k_r$ is the opposite direction to $k_i$. The incident wave 540 is defined as a plane harmonic wave.

Under the above conditions, the electromagnetic waves of each of the incident wave, reflected wave, and transmitted wave can be represented by two wave equations as follows.

$$E_{y,i}(z, t) = A_i e^{j(\omega t - k_1 z)}$$
$$H_{x,i}(z, t) = -\frac{A_i}{Z_{c,1}} e^{j(\omega t - k_1 z)}$$
[Equation 1]

$$E_{y,r}(z, t) = B_r e^{j(\omega t - k_1 z)}$$
$$H_{x,r}(z, t) = \frac{B_r}{Z_{c,1}} e^{j(\omega t - k_1 z)}$$
[Equation 2]

$$E_{y,t}(z, t) = C_t e^{j(\omega t - k_2 z)}$$
$$H_{x,t}(z, t) = -\frac{C_t}{Z_{c,2}} e^{j(\omega t - k_2 z)}$$
[Equation 3]

Here, $A_i$ is the amplitude of the incident wave 540, and $B_r$ is the amplitude of the reflected wave 550. The reflection coefficient Γ in the case of vertical incidence is defined as the ratio of the amplitude of the incident wave to the reflected wave.

$$\Gamma = \frac{B_r}{A_i}$$
[Equation 4]

By approximating (, $\mu/\mu_0=1$) permeability μ to 1, square of the refractive index n is the same as ε, and the following equation is obtained.

$$\Gamma = \frac{n_1 - n_2}{n_1 - n_2} = \frac{1-n}{1+n} = \frac{1-\sqrt{\varepsilon}}{1+\sqrt{\varepsilon}}$$
[Equation 5]

Here, $n=n_2/n_1$, $\varepsilon=\varepsilon_2/\varepsilon_1$

The permittivity is as shown below.

$$\varepsilon = \left(\frac{1+\Gamma}{1-\Gamma}\right)^2$$
[Equation 6]

Here, when the first medium 510 is a free space, $\varepsilon_1=\varepsilon_0=1$, and $\varepsilon=\varepsilon_2$. Thus, the permittivity of food can be calculated from the ratio of the magnitude of the electromagnetic waves irradiated to the food to the magnitude of the reflected wave from the food (reflectance $R=|\Gamma|^2$).

Figure 6:
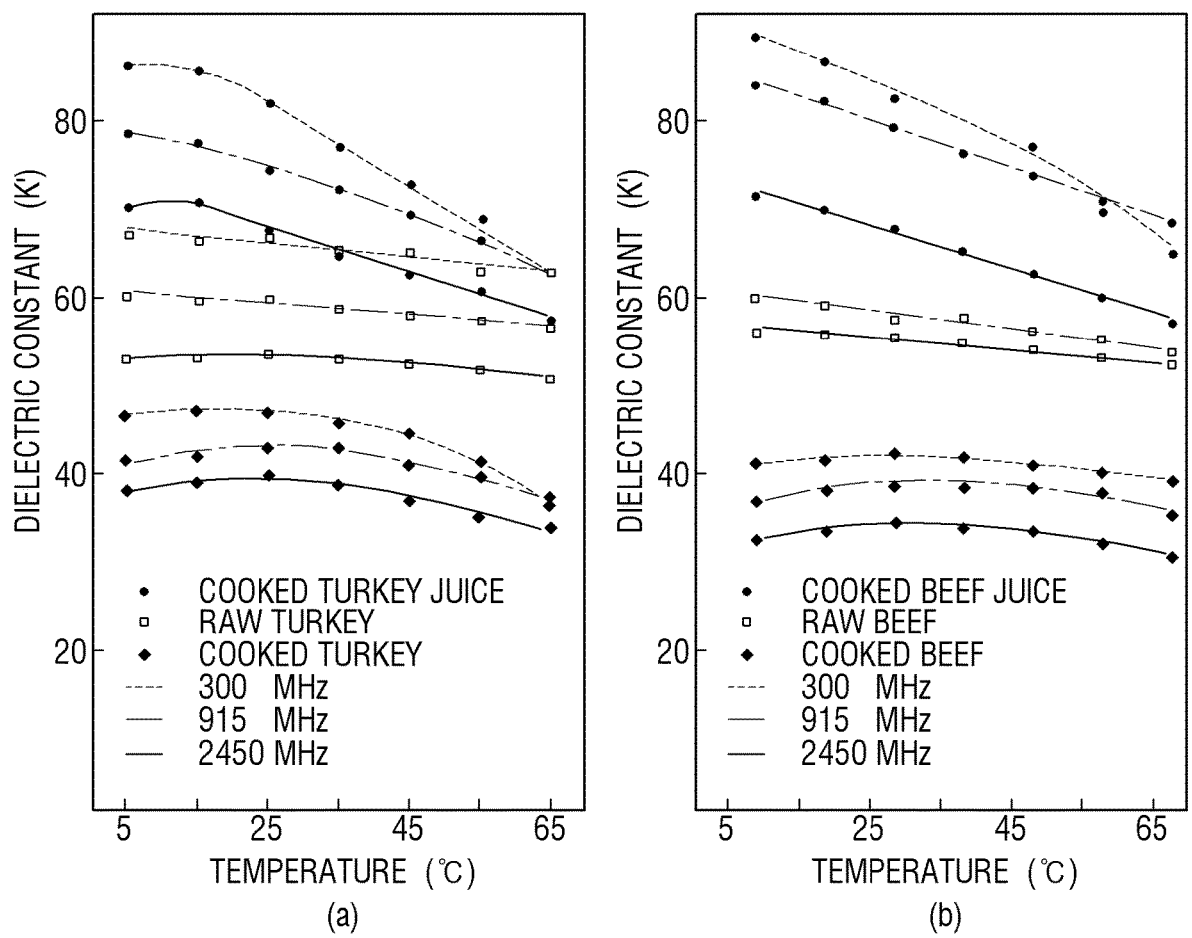
FIG. 6 is a graph which illustrates dielectric constant of food according to temperature of food which is different by frequencies.

FIG. 6 is a graph which illustrates dielectric constant of food according to temperature of food which is different by frequencies.

Referring to FIG. 6, FIG. 6(*a*) shows the dielectric constant K' of turkey gravy, turkey meat, and cooked turkey meat according to the temperature when electromagnetic waves are irradiated at different frequencies of 300 MHz, 915 MHz and 2450 MHz.

And FIG. 6(*b*) is a graph showing the dielectric constant K' according to temperature when electromagnetic waves are irradiated on gravy of beef, raw beef, and cooked beef at different frequencies of 300 MHz, 915 MHz and 2450 MHz.

First, when analyzing the graph of FIG. 6(*a*) by cooking objects, the gravy of turkey, turkey raw meat and cooked turkey meat have mutually different dielectric constants, and the tendency that the dielectric constant varies according to each temperature has different inclines.

It can be confirmed that the dielectric constant varies depending on the frequency of the electromagnetic waves. In all three foods, the lower the frequency, the higher the dielectric constant. However, the degree to which the dielectric constant decreases with increasing frequency at a certain temperature differs depending on the food.

That is, the graph approximating the dielectric constant that varies with temperature differs depending on the frequency of the electromagnetic wave irradiated. The difference between the dielectric constant estimated by electromagnetic wave of 300 MHz and the dielectric constant estimated by electromagnetic wave of 915 MHz in gravy of turkey at 45° C. is smaller than the difference between dielectric constant estimated by electromagnetic wave of 915 MHz and dielectric constant estimated by electromagnetic wave of 2450 MHz. The estimated dielectric constant of the cooked turkey meat at 65° C. and the gravy of the turkey meat after irradiation with electromagnetic waves of 300 MHz and 915 MHz is almost the same.

From the same point of view of the graph of FIG. 6(b), the beef gravy, the beef raw meat, and the cooked beef each have a larger dielectric constant than that of the turkey dish of FIG. 6(a). In addition, the dielectric constant of raw meat of beef rapidly drops according to temperature, but the dielectric constant of cooked beef does not change much even when the temperature rises.

In the meantime, the dielectric constant of each beef is higher if frequency of irradiated electromagnetic wave is lower.

When the cooking apparatus 100 irradiates food with electromagnetic waves of the same amplitude in a wide frequency band on the basis of the graph characteristics described above, which food is to be cooked can be grasped from the characteristic that the reflected waves of different amplitudes are received over the frequency band (i.e., the characteristic that the dielectric constant calculated at a specific frequency decreases differently as the temperature is increased as the cooking progresses).

In addition, various dielectric constants (similarly, impedances) calculated by irradiating ultra-wideband electromagnetic waves at the beginning of cooking allow us to grasp the food to be cooked. The characteristic that the dielectric constant changes according to the temperature change of the grasped food enables to grasp the temperature corresponding to the changing dielectric constant as the cooking progresses.

The aforementioned characteristics relating to frequency and dielectric constant which can be grasped through FIG. 6 may be analyzed through an experiment and stored in a storage as data.

Figure 7:
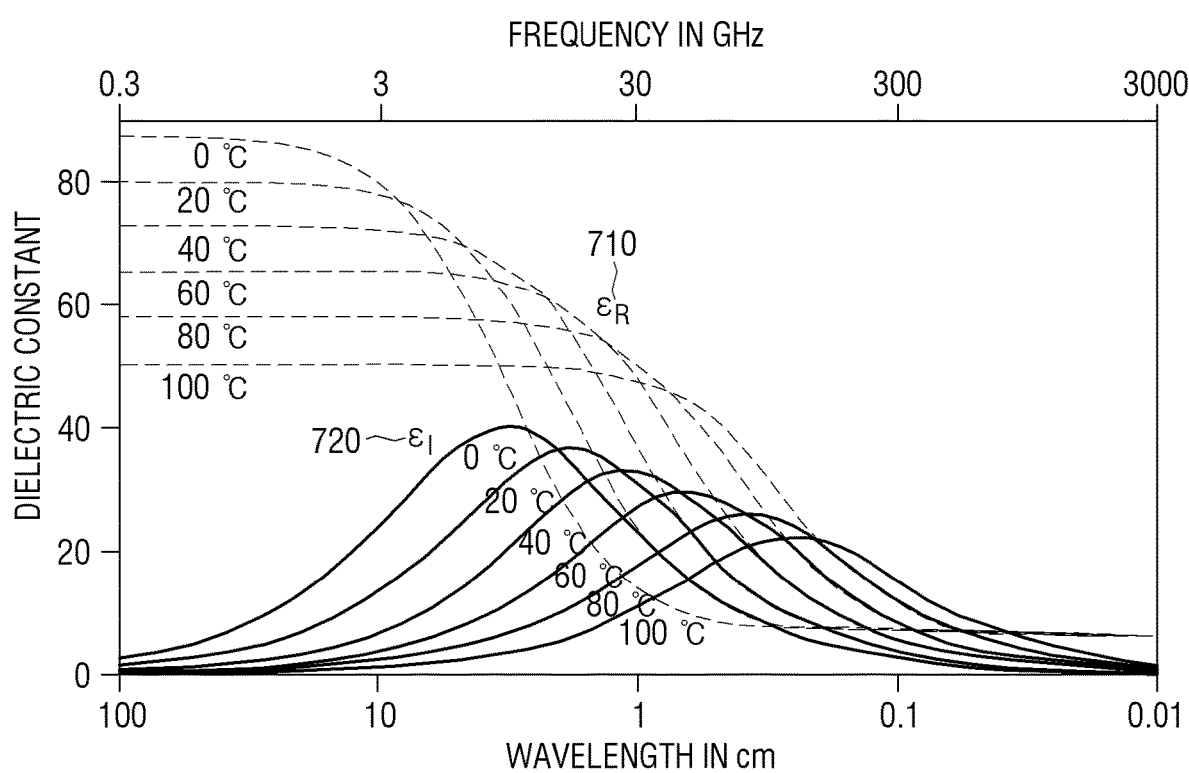
FIG. 7 is a graph which illustrates dielectric constant of water which changes according to wave/frequency of electromagnetic wave.

FIG. 7 is a graph which illustrates dielectric constant of water which changes according to wave/frequency of electromagnetic wave.

Referring to FIG. 7, the graphs of real number $\varepsilon_R$ 710 of permittivity of water and imaginary number $\varepsilon_1$ 720 are illustrated together. The $\varepsilon_R$ 710 gradually decreases from a lower frequency to a high frequency.

Water at 0° C. has the largest dielectric constant for low frequency electromagnetic waves, but sharply decreases from 3 Ghz and converges to almost zero from 30 GHz onwards. However, water at 100° C. has the lowest real dielectric constant for low-frequency electromagnetic waves, but the dielectric constant begins to decrease at 30 GHz.

As for the dielectric constant $\varepsilon_I$ 720 of the imaginary number, the lower the temperature of water, the lower the frequency at which the peak reaches, and higher the temperature, the higher the frequency at which the peak reaches.

As described above, in order to estimate the temperature of the food from the characteristics of the water-frequency permittivity of water contained in a large proportion of the food, it is understood that electromagnetic waves having a wide frequency band must be examined.

Figure 8:
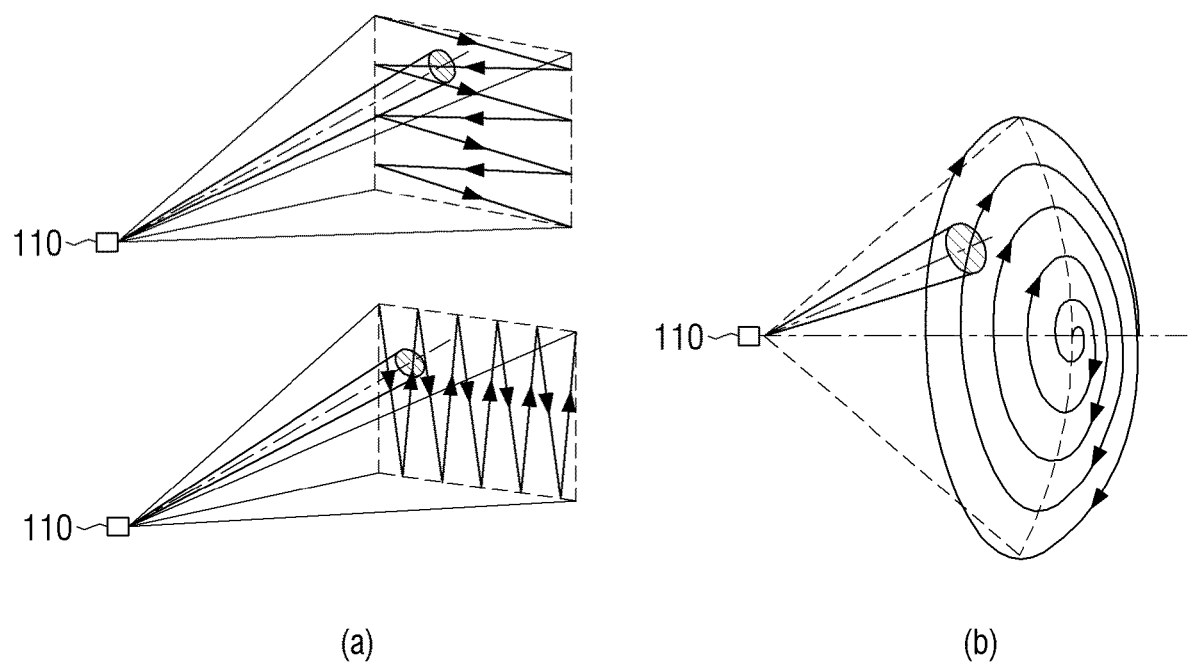
FIG. 8 is a drawing which illustrates a scanning method to beamformed electromagnetic wave.

FIG. 8 is a drawing which illustrates a scanning method to beamformed electromagnetic wave.

In FIG. 8(a), the transmission antenna 10 scans a place where food is disposed in a front direction by zigzag pattern or raster scan pattern.

In FIG. 8(b), the transmission antenna 110 increases a radius from the center and scans a place where food is located on a front surface with a spiral pattern.

In addition to the aforementioned two scanning operations, the transmission antenna 110 may irradiate beam-formed electromagnetic wave with various patterns which can detect an entire space of food.

Figure 9:
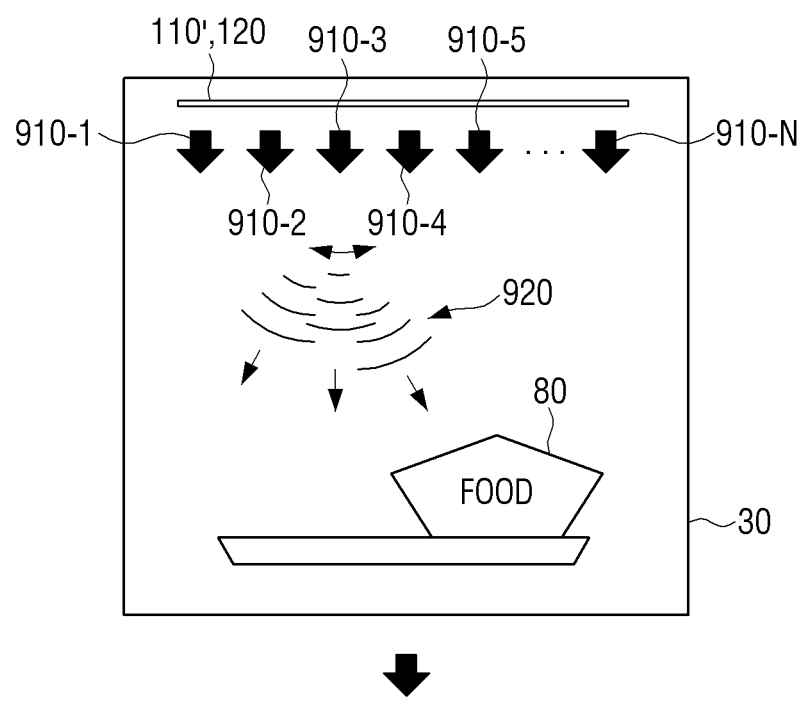
FIG. 9 is a drawing which illustrates a method for scanning and shape detection according to an exemplary embodiment.
Figure 9:
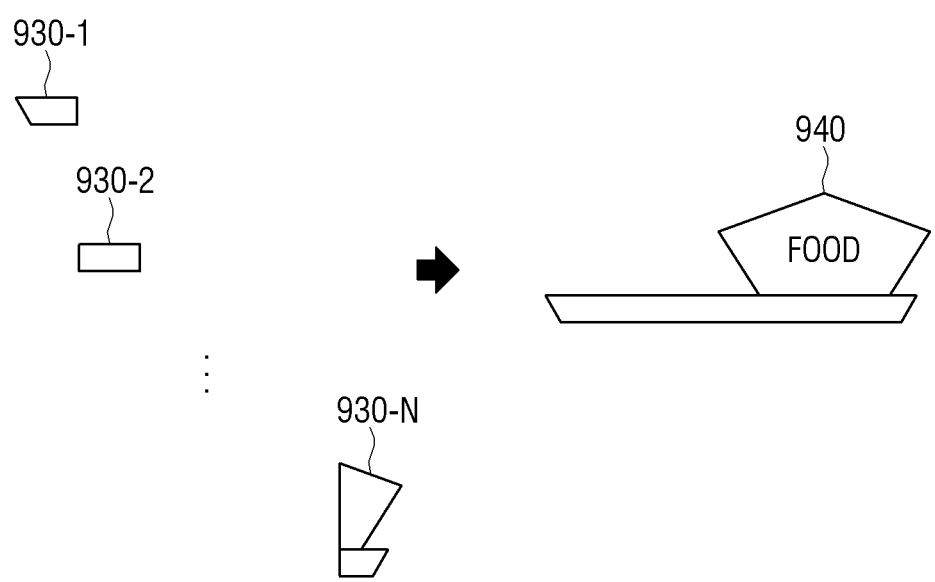

FIG. 9 is a drawing which illustrates a method for scanning and shape detection according to an exemplary embodiment.

Referring to FIG. 9, the transmission antenna 110' includes beamformed electromagnetic waves 920 from the plurality of positions 910-1, 910-2, 910-3, 910-4, 910-5, . . . , 910-N). Specifically, the transmission antenna 110' is disposed at a plurality of positions 910-1, 910-2, 910-3, 910-4, 910-5, . . . , 910-N on the upper surface of the cooking chamber 30, and performs scanning to irradiate the beam-formed electromagnetic waves 920 in various spaces toward the beam splitter 80. In one embodiment, the transmission antenna 110' may include a horizontal rail capable of moving at a plurality of locations 910-1, 910-2, 910-3, 910-4, 910-5, . . . , 910-N and a linear array antenna for irradiating the beamformed electromagnetic waves 920. In another embodiment, transmission antenna 110' may include a plurality of linear array antennas respectively disposed at a plurality of positions 910-1, 910-2, 910-3, 910-4, 910-5, . . . , 910-N.

Electromagnetic waves 920 emitted from the plurality of positions 910-1, 910-2, 910-3, 910-4, 910-5, . . . , 910-N are transmitted to the dishes and food 80 in a floor of the cooking chamber 30 and is received by the reception antenna 120. Specifically, the reception antenna 120 may receive reflected wave which is reflected from the position of the dish and the food 80 corresponding to the electromagnetic wave 920 irradiated from the plurality of positions 910-1, 910-2, 910-3, 910-4, 910-5, . . . , 910-N. In an exemplary embodiment, the transmission antenna 120 may be implemented in a single structure coupled to reception antenna 110'.

The controller 130 may control the transmission antenna 110' so that the transmission antenna 110' sequentially receives the beam-formed electromagnetic waves at a plurality of positions 910-1, 910-2, 910-3, 910-4, 910-5, . . . , 910-N. In one embodiment, the controller 130 may sequentially move the linear array antenna to a plurality of positions 910-1, 910-2, 910-3, 910-4, 910-5, . . . , 910-N. In another embodiment, the antenna arrays 110' arranged side by side in a plurality of locations 910-1, 910-2, 910-3, 910-4, 910-5, . . . , 910-N can be controlled to illuminate the beamformed electromagnetic waves 920.

The controller 130 detects a plurality of shapes 930-1, 930-2, . . . , 930-N based on the received reflected wave. Specifically, the controller 130 can detect a plurality of shapes 930-1, 930-2, . . . , 930-N with respect to the bottom of the cooking chamber 30 based on the reflected position and direction of the received reflected wave. Here, the plurality of shapes 930-1, 930-2, . . . , 930-N with respect to the bottom of the sensed cooking chamber 30 are divided into a plurality of positions 910-1, 910-2, 910-3, 910-4, 910-5, . . . , and 910-N in response to the electromagnetic waves 920 corresponding to the sequentially received reflected waves.

The controller 130, in order to detect a shape of a bottom of the cooking chamber 30, may use at least one of time of fight (ToF) and direction of arrival (DoA). In addition to ToF and DoA, may technologies to detect a shape of an object using a radar can be applied to the cooking apparatus 100.

The controller 130 combines the plurality of sensed shapes 930-1, 930-2, . . . , 930-N to generate one shape 940. The controller 130 may provide the generated shape 940 to the user so that the user can grasp the inside of the closed cooking chamber 30. In one embodiment, the dish at the bottom of the upper cooking chamber 30 may be a cooking utensil (e.g., a turntable) that constitutes the cooking apparatus 100. The controller 130 may determine a position, size, and a shape of the food from the generated shape 940.

Figure 10:
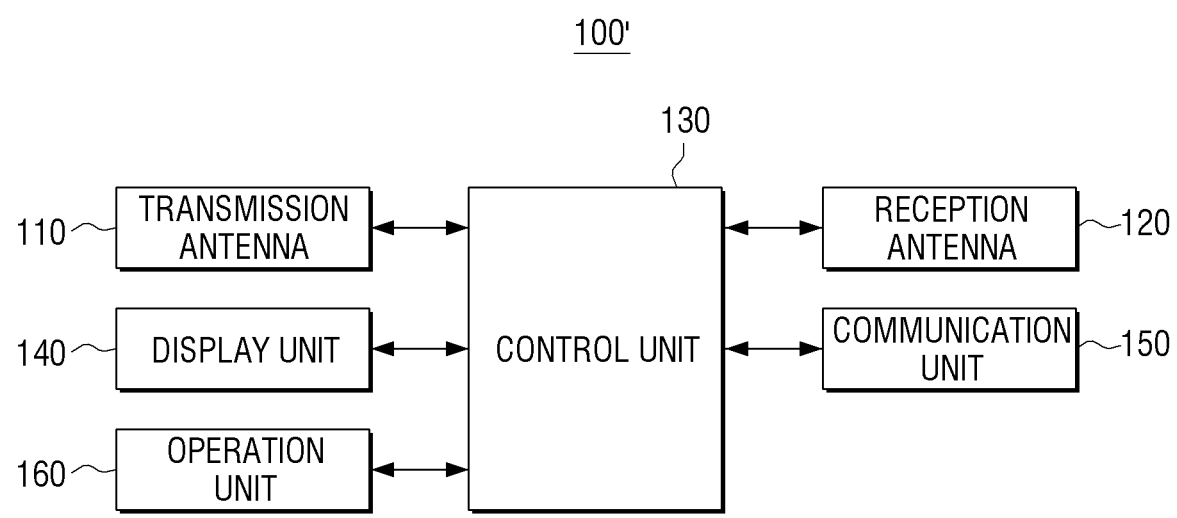
FIG. 10 is a block diagram illustrating a configuration of a cooking apparatus according to another exemplary embodiment.

FIG. 10 is a block diagram illustrating a configuration of a cooking apparatus according to another exemplary embodiment.

Referring to FIG. 10, the cooking apparatus 100' includes the transmission antenna 110, the reception antenna 120, the controller 130, the display 140, the communicator 150, and the operator 160.

The transmission antenna 110 irradiates the beamformed electromagnetic wave, and the reception antenna 120 receives reflected wave reflected from food. The operation and configuration of the transmission antenna 110 and the reception antenna 120 are the same as the transmission antenna 110 and the reception antenna 120 of FIG. 2 and will not be further described.

The display 140 displays a screen including UI or cooking state information for setting the cooking apparatus 100'. Specifically, the display 140 may display a screen providing information on the progress of cooking, the degree of cooking of the food, the setting state of the cooking apparatus 100, and the like.

The display 140 may be implemented as various display panels such as Liquid Crystal Display Panel (LCD Panel), Plasma Display Panel (PDP), Organic Light Emitting Diode (OLED), Vacuum Fluorescent Display (VFD), Field Emission Display (FED), and Electro Luminescence Display (ELD).

The communicator 150 performs communication with an external device. Specifically, the communicator 150 can transmit the cooking information to an external device and perform communication to receive a user command. The external device may be a portable terminal device or a home server for monitoring and managing a plurality of devices of the home network system.

The communicator 150 may include various communication chips such as a Wi-Fi chip, a Bluetooth chip, an NFC chip, a wireless communication chip, and the like. Here, the Wi-Fi chip, the Bluetooth chip, and the NFC chip can perform communication using the WiFi method, the Bluetooth method, and the NFC method, respectively.

The operator 160 receives an operation of the user. More specifically, the operator 160 can receive a user's operation for driving and setting the cooking apparatus 100. The operator 160 may include one or a plurality of button members, a jog dial, and the like. In addition, the operator 160 may be implemented as a touch sensor that is coupled with the display panel of the display 150 to sense a user's touch operation.

The controller 130 controls each configuration of the cooking apparatus 100. To be specific, the controller 130 may determine temperature of food based on the received reflected wave.

The controller 130 determines the cooking state based on the received reflected wave. Specifically, the controller 130 can determine not only the temperature of the food but also the state related to the cooking of the food. For example, the controller 130 can determine the cooking time, the shape of the interior of the cooking chamber, the location and size of food, and the like.

The controller 130 may display the detected shape of the cooking chamber on the display 150. In addition, the controller 130 may display the determined temperature of the food on the display 150. In this case, the controller 130 can visually display the temperature of the food together with the shape of the cooking chamber. A more detailed description thereof will be described later with reference to FIG. 11.

The controller 130 transmits the sensed cooking state information to the external device through the communicator 150. For example, the controller 130 may transmit the cooking state information including the start/completion of cooking, the cooking time, the target temperature, the cooking progress, and the like to the user terminal at predetermined intervals.

As described above, the cooking apparatus 100' according to an exemplary embodiment may notify a user in a remote place cooking information on a real-time basis, visually express cooking information, and provide the information to a user.

Figure 11:
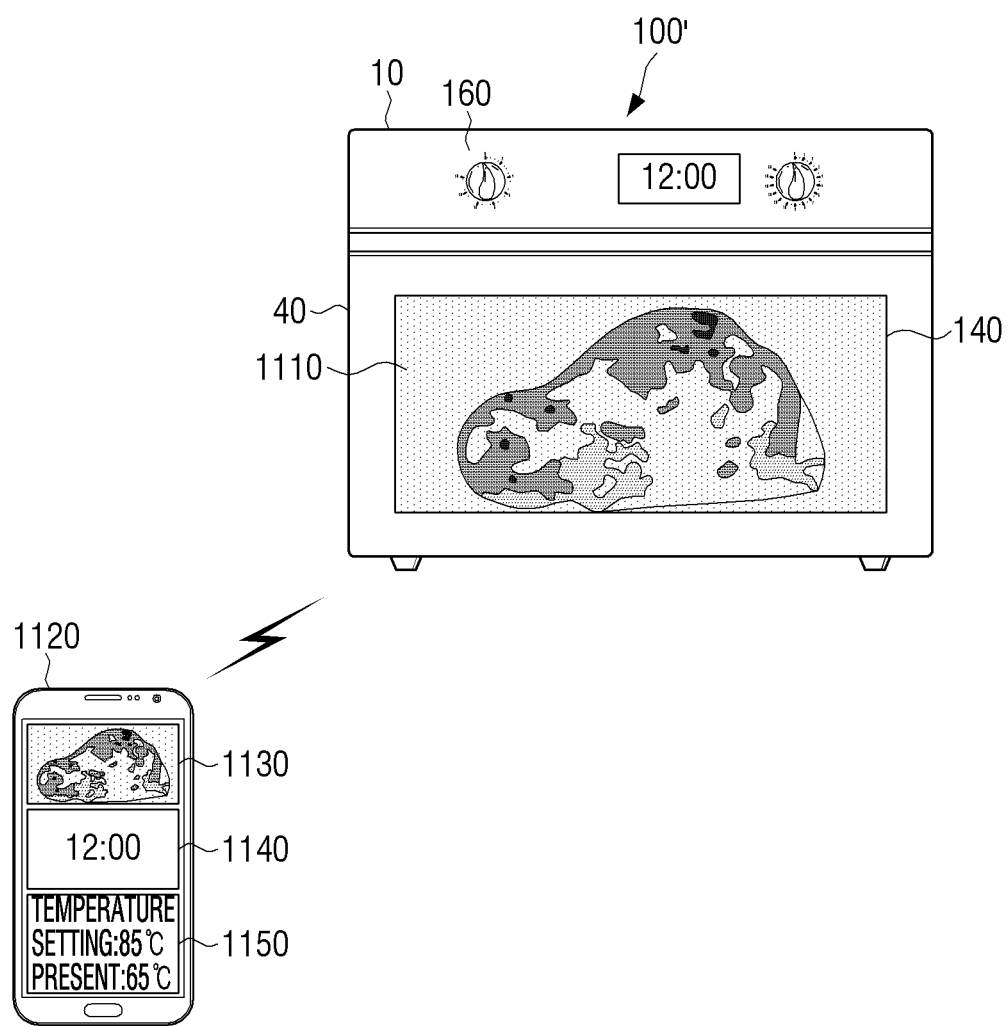
FIG. 11 is a view illustrating an example of a method for providing cooking state information.

FIG. 11 is a view illustrating an example of a method for providing cooking state information.

Referring to FIG. 11, the cooking apparatus 100' includes an operator 160 on the front surface and a display 140 on the door 40. The display 140 displays an image 1110 that visually displays the shape of the food inside the cooking chamber and the sensed temperature.

Specifically, the screen displayed by the display 140 includes an image that graphically represents the shape of food being cooked in the cooking chamber. Then, the shape of the food is colored to correspond to the sensed temperature. For example, a food image can display an image of a food similar to a thermal image taken with a thermal infrared camera.

The cooking apparatus 100' transmits the cooking state information to the user terminal device 1120. The user terminal 1120 receiving the cooking status information displays cooking status information updated in real time. The user terminal device 1120 displays a screen including the food cooking image 1130, the cooking time 1140, and the sensed temperature information 1150. The food cooking image 1130 may be the same as the image 1110 displayed on the display 140. The cooking time 1140 may be the time elapsed since the user started cooking through the operating unit 160. The temperature information 1150 may include the set temperature of the target set by the user through the operator 160 and the temperature of the currently sensed food.

The cooking apparatus according to the aforementioned exemplary embodiment may visually check cooking status of food inside a cooking apparatus and check cooking status and setting from a remote place through communication.

Figure 12:
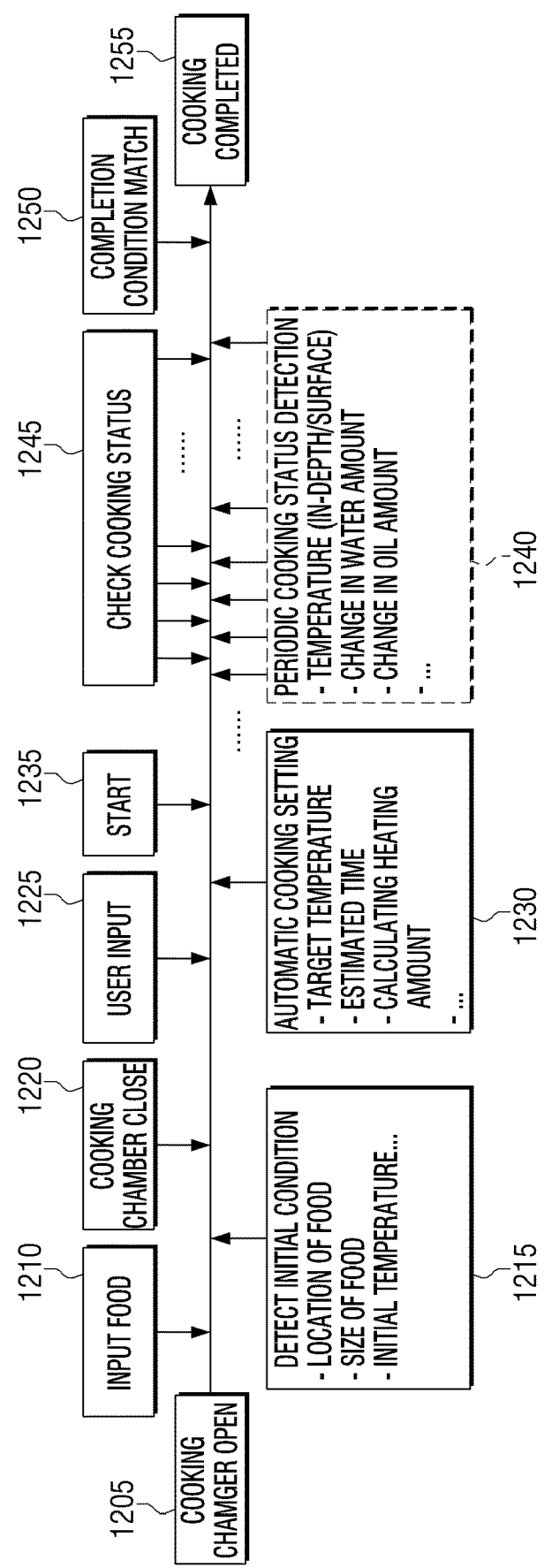
FIG. 12 is a timeline to describe a scenario for cooking food using a cooking apparatus according to an exemplary embodiment.

FIG. 12 is a timeline to describe a scenario for cooking food using a cooking apparatus according to an exemplary embodiment.

Referring to FIG. 12, a user opens a door of the cooking apparatus 1205 and inputs food to a cooking chamber 1210.

When the food is put into the cooking chamber 1210, the cooking apparatus senses the initial condition of the food 1215 such as the position of the food, the size of the food, and the initial temperature. Here, the cooking apparatus can scan the shape of the interior of the cooking chamber while controlling the directivity of the beamformed broadband electromagnetic wave using the transmission antenna. Further, the cooking apparatus can calculate the impedance (or permittivity) of the food using the received reflected wave, and determine the type of food and the corresponding temperature based on the calculated impedance.

The user closes the door of the cooking chamber 1220 and inputs the desired cooking setting through the operator 1225. The cooking apparatus sets an automatic cooking according to a user's input 1230. For example, the user inputs the thawing through the operator, the cooking apparatus sets the temperature for thawing to the target temperature, calculates the estimated time and heating amount from the detected volume of the food and the initial temperature to the completion of thawing. The setting information can be displayed to the user through the display.

The user who checked the displayed setting information presses a start 1235 button of the operator. The cooking apparatus which receives a start command by a user input start cooking.

The cooking apparatus periodically senses the cooking state during cooking 1240. Specifically, the cooking apparatus can perform the scanning operation using the periodically beamformed electromagnetic waves to determine the temperature of the food. The temperature of the food may be the temperature at the internal location of the food and at the localized location of the surface. Further, the cooking apparatus can judge the change of the water amount and the oil amount of the food that changes as the cooking progresses.

The cooking apparatus can display the information of the detected cooking state through the display. The user can continuously check the changing cooking status through the displayed information.

The user may stop the operation of the cooking apparatus when the confirmed cooking condition reaches a desired condition 1250. Alternatively, the cooking apparatus can automatically stop operation 1250 when the automatically set completion condition is reached. In one example, the interruption of operation may consist of shutting off the supply of power to the magnetron that emits microwaves or to the heat line that emits heat.

After the cooking is started, the cooking apparatus determines that the cooking is completed 1255 when the user reopens the door and takes out the food. At this time, the cooking apparatus can learn the progress information of cooking the food until the cooking is completed. For example, a cooking apparatus can learn settings that are frequently used by the user and the degree of heating that the user prefers. Thereafter, when a cooking menu of the same food is selected, cooking suitable for the user can be performed according to the detected volume of the food and the initial temperature.

The above-described scenario of the cooking apparatus is an exemplary one, and the order of operations of the user's input operation and determination and setting of the cooking apparatus side may be different. For example, after the cooking start command is received by the button input 1235 of the start button immediately after the user input 1225, the cooking apparatus can perform the initial condition detection 1215 and the automatic cooking setting 1230.

Figure 13:
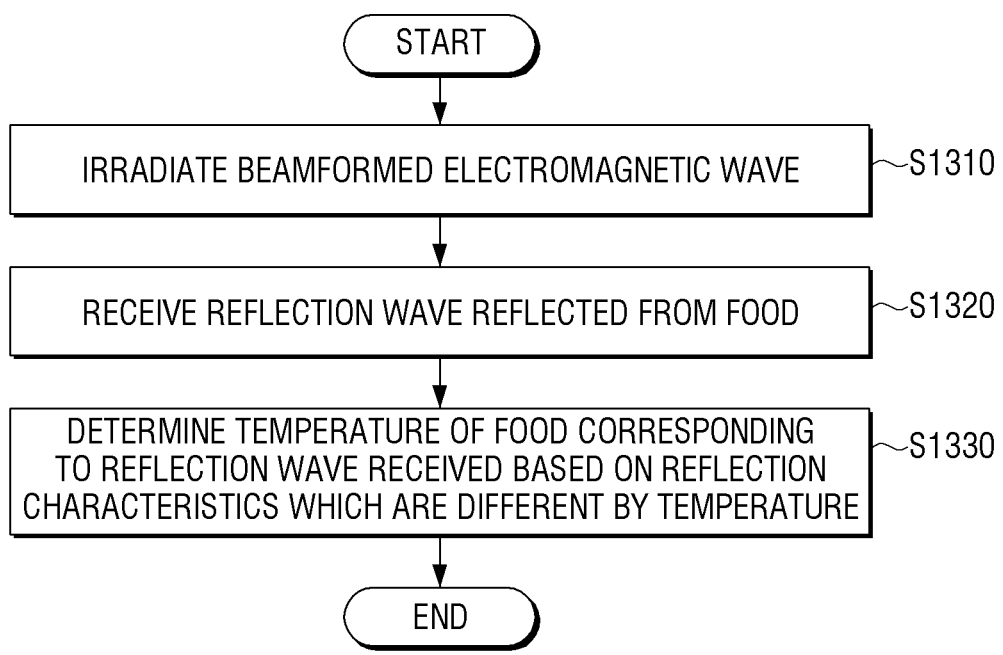
FIG. 13 is a flowchart to describe a controlling method according to an exemplary embodiment.

FIG. 13 is a flowchart to describe a controlling method according to an exemplary embodiment.

Referring to FIG. 13, the control method first irradiates the beamformed electromagnetic wave (S1310). Specifically, the cooking apparatus irradiates the inside of the cooking chamber with beamformed electromagnetic waves having directivity to an arbitrary space. The beamformed electromagnetic waves can be generated by the array antenna. And the beamformed electromagnetic wave can be a broadband electromagnetic file having a bandwidth of 500 MHz or more.

Next, the reflected wave reflected from the food is received S1320. Specifically, the cooking apparatus can receive the reflected wave reflected by the irradiated electromagnetic wave against the food through the receiving antenna.

In addition, the control method determines the temperature of the food corresponding to the received reflected wave based on the characteristic that the electromagnetic waves are reflected differently according to the temperature of the food S1330. Specifically, the cooking apparatus can determine the temperature of the food corresponding to the received reflected wave based on the received reflected wave of different amplitudes, due to the reflectance that the irradiated electromagnetic wave varies depending on the temperature of the food, that is, the change in the permittivity. More specifically, the cooking apparatus can calculate the impedance inside the cooking chamber that uses the transmission/reception antenna as the input/output port, and determine the temperature corresponding to the calculated impedance by referring to the lookup table pre-stored in the database.

Here, the cooking apparatus can scan the inside of the cooking chamber using the beamformed electromagnetic waves, and can detect the shape of the cooking chamber. Further, the cooking apparatus can determine the composition of the food by frequency analysis of the received reflected wave by irradiating electromagnetic waves of a wide band.

The above control method may further include an additional step. Specifically, the cooking apparatus can sense at least one of the size, position, and shape of the food based on the received reflected wave. In this case, the cooking apparatus can display the shape of the cooking cavity, which is grasped by combining a plurality of shapes sensed at a plurality of positions, through the display. In addition, the cooking device can visually indicate the local temperature of the judged food. Then, the cooking device can transmit cooking setting information, cooking state information, and the like to the external device.

The control method of the cooking apparatus as described above can measure the temperature of the food by noncontact/non-invasive method. The control method as shown in FIG. 13 can also be carried out in the cooking apparatuses further including the cooking apparatuses of FIGS. 2 and 10.

The non-transitory computer readable medium refers to a medium that stores data semi-permanently, and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

The foregoing example embodiments and advantages are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A cooking apparatus to heat a substance, the cooking apparatus comprising:
   a transmission antenna configured to irradiate the substance with electromagnetic waves so that the electromagnetic waves are reflected from the substance;
   a reception antenna configured to receive the reflected electromagnetic waves;
   a heat portion to heat the substance; and
   a processor configured to
      determine, based on a property of the received reflected electromagnetic waves, a current temperature of the substance, a target temperature to which the substance is to be heated from the current temperature, and a cooking time for the determined current temperature to reach the determined target temperature, and control the heat portion to heat the substance from the determined current temperature to the determined target temperature for the determined cooking time.

2. The cooking apparatus of claim 1, wherein the processor is further configured to, determine the current temperature of the substance based on an impedance of the substance which changes according to the current temperature of the substance and a property that the received reflected electromagnetic waves are reflected differently.

3. The cooking apparatus of claim 2, wherein the processor is further configured to calculate a dielectric permittivity to determine the impedance of the substance and determine the current temperature of the substance corresponding to the calculated dielectric permittivity using an amplitude ratio of the electromagnetic waves irradiated to the substance to the received reflected electromagnetic waves.

4. The cooking apparatus of claim 1,
wherein the irradiated electromagnetic waves having a bandwidth greater than or equal to 500 MHz, and
the processor is further configured to
determine elements of the substance through frequency analysis of the received reflected electromagnetic waves based on a property that bandwidths to absorb electromagnetic waves are different according to elements constituting the substance, and
determine the current temperature of the substance corresponding to elements of the determined substance based on a property that the reflected electromagnetic waves are reflected differently according to the current temperature of the substance and elements of the substance.

5. The cooking apparatus of claim 1, wherein the transmission antenna is an array antenna in which a plurality of antenna elements are aligned and the processor is further configured to change a phase of the electromagnetic waves.

6. The cooking apparatus of claim 1, wherein the processor is further configured to manipulate directivity of the electromagnetic waves, and when a received reflected electromagnetic wave which is reflected from a different space is received by the reception antenna, identify
at least one of a position of the substance, a size of the substance, and a shape of the substance based on the received reflected electromagnetic wave.

7. The cooking apparatus of claim 6, further comprising:
a display which displays a screen including cooking state information and visually displays the determined current temperature.

8. The cooking apparatus of claim 6,
wherein the cooking apparatus includes a plurality of transmission antennas, the plurality of transmission antennas are arranged side by side at different positions along an internal wall of a cooking chamber of the cooking apparatus, and
the processor is further configured to control the plurality of transmission antennas to sequentially irradiate the electromagnetic waves at the different positions, detect a plurality of shapes of the cooking chamber based on sequentially receiving the reflected electromagnetic waves, and detects at least one of the position of the substance, the size of the substance, and the shape of the substance by combining a shape of the plurality of detected shapes of the cooking chamber.

9. The cooking apparatus of claim 1, further comprising:
a communicator configured to communicate with a user terminal at a remote place,
wherein the processor is further configured to transmit a cooking state information of the substance to the user terminal.

10. The cooking apparatus of claim 1,
wherein the heating portion includes at least one of a magnetron which irradiates microwaves or a heating line which irradiates heat by electric resistance on the cooking chamber, and the processor is further configured to identify when the current temperature of the substance reaches a preset temperature and stop the heating portion.

11. A controlling method of a cooking apparatus which heats a substance, the method comprising:
irradiating the substance with electromagnetic waves so that the electromagnetic waves are reflected from the substance;
receiving the reflected electromagnetic waves;
determining, based on a property of the received reflected electromagnetic waves, a current temperature of the substance, a target temperature to which the substance is to be heated from the current temperature, and a cooking time for the determined current temperature to reach the determined target temperature, and
heating the substance from the determined current temperature to the determined target temperature for the determined cooking time.

12. The method of claim 11, wherein determining the current temperature of the substance determines the current temperature based on an impedance of the substance which changes according to the current temperature of the substance and a property that the received reflected electromagnetic waves are reflected differently.

13. The method of claim 12, wherein determining the current temperature of the substance determines the current temperature based on an amplitude ratio of the irradiated electromagnetic waves to the received reflected electromagnetic waves and calculating a dielectric permittivity to determine the impedance of the substance.

14. The method of claim 11, wherein
the irradiated electromagnetic waves has a bandwidth greater than or equal to 500 MHz, and the method further comprises
determining elements of the substance through frequency analysis of the received reflected electromagnetic waves based on a property that bandwidths to absorb electromagnetic waves are different according to elements constituting the substance, and
determining the current temperature of the substance corresponding to elements of the determined substance based on a property that the received electromagnetic waves are reflected differently according to current temperature of the substance and elements.

15. The method of claim 11 further including,
changing a phase of the electromagnetic waves and irradiating the electromagnetic waves to the substance.

* * * * *